Sept. 12, 1933.  G. H. HUNT  1,926,385
BRAKE
Filed Dec. 10, 1931

INVENTOR
GEORGE H. HUNT
BY
ATTORNEY

Patented Sept. 12, 1933

1,926,385

UNITED STATES PATENT OFFICE 1,926,385

BRAKE

George H. Hunt, South Bend, Ind., assignor to Bendix Aviation Corporation, South Bend, Ind., a corporation of Delaware Application December 10, 1931
Serial No. 580,197

4 Claims. (Cl. 188—78)

This invention relates to brakes and more particularly to internal expanding brakes.

Broadly, the invention comprehends an outboard anchor for the friction elements of an internal expanding brake illustrated as being of the three-shoe type. In the illustrated embodiment, the friction elements or shoes of a brake are anchored on a backing plate through the instrumentality of an anchor preferably formed in a homogeneous mass having a flange which may be riveted or otherwise secured to the backing plate and a slot in which the friction elements or shoes are anchored. As shown, the anchored ends of the secondary and auxiliary friction elements or shoes are arranged in interleafing overlapping relation and embrace suitable pivots passing transversely through the slotted portion of the anchor.

A major object of the invention is to provide an anchor for the friction elements of a brake having great strength and rigidity.

Another object of the invention is to provide an anchor for the friction elements of an internal expanding brake constructed and arranged to withstand all stresses and strains imposed thereon.

A further object of the invention is to provide an anchor for the friction elements of an internal expanding brake having attaching means and spaced pivots for the friction elements.

Still a further object of the invention is to provide an anchor for the friction elements of an internal expanding brake including spaced supports for pivot members on which the friction elements anchor, so that stresses and strains imposed on the anchor may be equally distributed.

A feature of the invention is an anchor for the friction elements of a brake having spaced supports for the anchor pins.

Another feature of the invention is a slotted member having spaced parallel bores arranged transversely of the slot for the reception of anchor pins, and friction elements having overlapping interleafing ends anchored on the pins within the slot.

Figure 1:
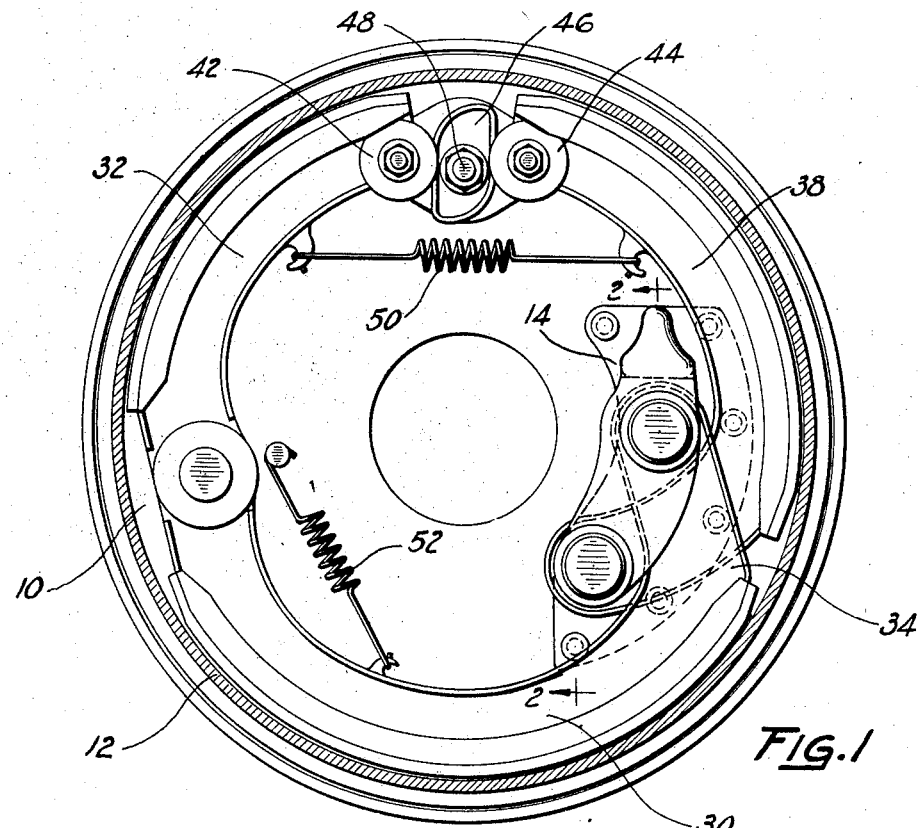
Figure 2:
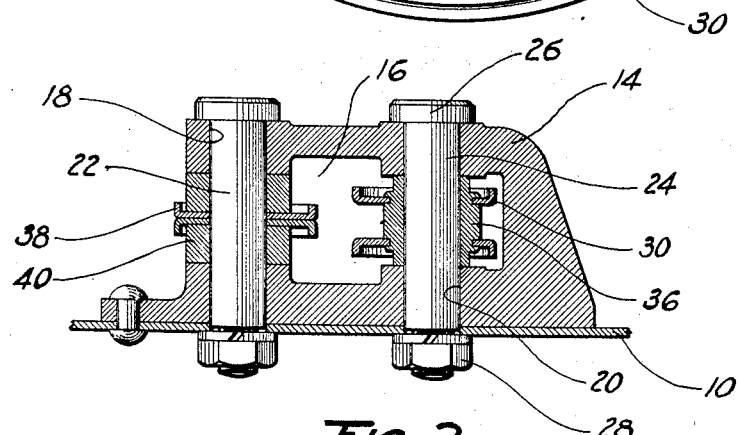

The above and other objects and features of the invention including various desirable details of structure will be apparent from the following description of the illustrated embodiment shown in the accompanying drawing, and in which:

Figure 1 is a vertical sectional view of a brake structure taken just back of the head of the drum, illustrating the invention as applied; and Figure 2 is a sectional view substantially on line 2—2, Figure 1.

Referring by numerals to the drawing, 10 represents a fixed support such as a backing plate. The backing plate has associated therewith a rotatable drum 12 which may be secured to a wheel, not shown. Positioned on the backing plate is an anchor 14. The anchor comprises a mass or a block having a base or flange seated against the backing plate and having a slot 16 and parallel bores 18 and 20 transversely disposed with respect to the slot. Positioned in the bores 18 and 20 are anchor pins or bolts 22 and 24. Each anchor pin has a substantial head 26 bearing flush against the top of the anchor and a stem extending through the backing plate to receive a nut 28 with a lock washer interposed.

Pivoted on the anchor pin 24 is a friction element 30 having pivotally connected thereto a friction element 32. The friction element 30 has a bifurcated end portion 34, the object of which will hereinafter appear, and a suitable bearing 36 embracing the anchor pin. Pivoted on the anchor pin 22 is a friction element 38. The anchored end of this element is positioned between the bifurcated portion 34 of the friction element 30 and is provided with a suitable bearing 40 embracing the pin.

The friction elements 32 and 38 have positioned for rotation on their respective separable ends rollers 42 and 44. A cam 46 is positioned for rotation between these rollers for spreading the shoes into drum engagement, and the cam is secured to a shaft 48 suitably connected to a power operating means, not shown.

A suitable return spring 50 connects the friction elements 32 and 38, and the friction element 30 is connected by an auxiliary return spring 52 to the backing plate. These springs serve to return the friction elements to the off position upon release of force applied through the cam and to retain them when in the off position in proper spaced relation to the drum.

It will be understood that the form of the invention herein described is to be taken as the preferred example of the underlying principle of the invention and that various changes in shape, size and arrangement of parts may be resorted to without departing from the spirit of the invention or the scope of the subjoined claims.

Having thus described the various features of the invention what I claim as new and desire to secure by Letters Patent is:

1. A brake comprising a fixed support, a block secured to the fixed support having a slot parallel to the fixed support and parallel bores transversely disposed to the slot, and anchor pins in the bores additionally securing the block to the support.

2. A brake comprising a fixed support, a block having a slot and parallel bores transversely disposed to the slot, a flange on the block for attaching the block to the fixed support, and anchor bolts extending through the bores and fixed support.

3. A brake comprising a fixed support, a rotatable drum associated therewith, a block secured to the fixed support having a slot parallel to the fixed support and parallel bores transversely disposed to the slot, anchor bolts in the bores securing the block to the fixed support, friction elements anchored on the anchor bolts, and means for spreading the friction elements into drum engagement.

4. A brake comprising a fixed support, a rotatable drum associated therewith, a block having a flange secured to the fixed support, said block having a slot parallel to the fixed support and parallel bores transversely disposed to the slot, anchor bolts extending through the bores and fixed support, friction elements anchored on the anchor bolts with their anchored ends overlapping one another, and means for spreading the shoes into drum engagement.

GEORGE H. HUNT.